United States Patent
Widmer et al.

(10) Patent No.: US 12,300,998 B2
(45) Date of Patent: May 13, 2025

(54) DEVICE AND METHOD FOR CONTROLLING AN INTERFACE FOR A POWER UTILITY

(71) Applicant: Hitachi Energy Ltd, Zürich (CH)

(72) Inventors: Theo Widmer, Birmenstorf (CH); Lorenzo Santoro, Döttingen (CH)

(73) Assignee: HITACHI ENERGY LTD, Zürich (CH)

( * ) Notice: Subject to any disclaimer, the term of this patent is extended or adjusted under 35 U.S.C. 154(b) by 755 days.

(21) Appl. No.: 17/616,385

(22) PCT Filed: Jun. 3, 2020

(86) PCT No.: PCT/EP2020/065271
§ 371 (c)(1),
(2) Date: Dec. 3, 2021

(87) PCT Pub. No.: WO2020/245143
PCT Pub. Date: Dec. 10, 2020

(65) Prior Publication Data
US 2022/0320898 A1 Oct. 6, 2022

(30) Foreign Application Priority Data
Jun. 3, 2019 (EP) .................................... 19177808

(51) Int. Cl.
*G06F 3/048* (2013.01)
*G06F 16/34* (2019.01)
(Continued)

(52) U.S. Cl.
CPC ........ *H02J 13/00034* (2020.01); *G06F 3/048* (2013.01); *H02J 13/00001* (2020.01);
(Continued)

(58) Field of Classification Search
CPC .......... G06F 3/048; G06F 16/34; G06F 16/41; H02J 13/00034; H02J 13/00001; H02J 13/00002; Y04S 10/40
See application file for complete search history.

(56) References Cited

U.S. PATENT DOCUMENTS

2005/0240381 A1 10/2005 Seiler et al.
2008/0183723 A1* 7/2008 Knipfer ................. G06Q 10/06
(Continued)

FOREIGN PATENT DOCUMENTS

| EP | 1850447 A1 | 10/2007 |
|----|------------|---------|
| JP | 2000-184595 A | 6/2000 |
| JP | 2018-137957 A | 8/2018 |

OTHER PUBLICATIONS

Kalki Communication Technologies Limited, Kalkitech SCL Manager 4.0.0 User Manual Version 1.0.0, Dec. 2008, Bangarole, India, www.kalkitech.com, 194 pages.

(Continued)

*Primary Examiner* — Ting Z Lee
(74) *Attorney, Agent, or Firm* — Procopio, Cory, Hargreaves & Savitch LLP (57) ABSTRACT

A device uses linking rules to process and optionally update a hierarchical substation model of a power system substation. The linking rules determine to which substation object at a first hierarchy level substation objects at a further hierarchy level of the hierarchical substation model are to be connected.

20 Claims, 4 Drawing Sheets

(51) Int. Cl.
*G06F 16/41* (2019.01)
*H02J 13/00* (2006.01)

(52) U.S. Cl.
CPC ........ *H02J 13/00002* (2020.01); *G06F 16/34* (2019.01); *G06F 16/41* (2019.01)

(56) References Cited

U.S. PATENT DOCUMENTS

| | | | | |
|---|---|---|---|---|
| 2010/0287512 | A1* | 11/2010 | Gan | G06F 16/26 |
| | | | | 715/854 |
| 2012/0036091 | A1* | 2/2012 | Cook | G06Q 10/04 |
| | | | | 705/412 |
| 2012/0316696 | A1* | 12/2012 | Boardman | H02J 13/00034 |
| | | | | 700/297 |
| 2014/0184606 | A1* | 7/2014 | de Richebourg | G06T 11/001 |
| | | | | 345/440 |
| 2014/0195844 | A1* | 7/2014 | Laval | G06F 8/38 |
| | | | | 713/340 |
| 2018/0357296 | A1* | 12/2018 | Michel | G06F 16/28 |

OTHER PUBLICATIONS

Marcadet et al., "RiseClipse: Why working at the model level is better for validating data conforming to IEC standards", 2016 Power Systems Computation Conference (PSCC), Power Systems Computation Conference, Aug. 11, 2016, 8 pages.

Harnishchmacher et al., "Effiziente Datenmodellierung im Anlagenengineering nach IEC 61850", ETZ Elektrotechnik + Automation (Sonderdruck), vol. 2007, No. 4, Apr. 30, 2007, 9 pages.

* cited by examiner

DEVICE AND METHOD FOR CONTROLLING AN INTERFACE FOR A POWER UTILITY

CROSS-REFERENCE TO RELATED APPLICATIONS

The present application claims priority to International Application No. PCT/EP2020/065271, filed on Jun. 3, 2020, which claims priority to European Application No. 19177808.3, filed on Jun. 3, 2019, which are both hereby incorporated herein by reference as if set forth in full.

FIELD OF THE INVENTION

The present disclosure relates to methods and devices for generating or modifying a hierarchical model of an asset, in particular a power utility such as a power system substation. This disclosure relates in particular to methods and devices for generating or modifying a hierarchical model of an asset and/or a corresponding graphical user interface that is used for configuring, commissioning, monitoring, or controlling operation of the asset.

BACKGROUND OF THE INVENTION

Modern power utilities, such as power generation systems, power grids, or substations, include a vast number of components, sensors, and intelligent electronic devices (IED(s)). Configuring, commissioning, monitoring, or controlling operation of the power utility is a complex task.

An operator can receive computer assistance in the complex tasks of configuring, commissioning, monitoring, or controlling operation of the power utility. Exemplary techniques that assist a commissioning engineer in commissioning are described in, e.g., EP 1 850 447 A1 or EP 2 109 204 A1.

EP 3 457 286 A1 discloses a computing device that generates commands to automatically set or verify a security configuration of an industrial automation control system.

EP 1 850 109 A1 discloses method of verifying the configuration of an Intelligent Electronic Device that is part of a Substation Automation system.

Kalkitech SCL Manager 4.0.0, User Manual, Version 1.0.0 describes a computer program that allows a new substation specification to be drawn.

Devices adapted to assist an operator in the tasks of configuring, commissioning, monitoring, or controlling operation of a power utility often employ a hierarchical model of the power utility and its components. For illustration, the substation section defined in International Electrotechnical Commission (IEC) 61850-6 provides a tree structure for a substation and its components.

The model in Substation Automation (SA) or power generation includes structures at lower hierarchy levels that are interconnected by objects at higher hierarchy levels of the hierarchical model. For illustration, a hierarchical SA model may include plural Bays or Diameters. The Bays or Diameters are interconnected with some dedicated equipment which is not part of the Bays or Diameters. For illustration, for Substation Automation, the Bays or Diameters are interconnected by Busbars. In a classical tree modelling, such interconnecting structures are often modelled on a higher hierarchy level than the parts which they interconnect.

When a branch view of the hierarchical model is displayed on a graphical user interface of a device, the fact that interconnecting structures are implemented on higher hierarchy levels gives rise to increased complexity when generating or updating a hierarchical model. For illustration, the interconnecting structure (e.g., a Busbar) can be modelled in a piecewise manner separately for each Bay or Diameter. The Busbar pieces in the model then have to be joined, which is error-prone and makes the modelling more complex. As an alternative, displaying iconic representations of the interconnecting structure (e.g., Busbar) in a Bay view without association with the data at the Voltage level of the hierarchical model may also be error-prone, because it is not guaranteed that the iconic representations that are generated as fake graphics merely for the purpose of displaying a Bay view are displayed in a manner that correctly takes into account the connections of the elements in the Bay to the interconnecting structure. Both a piecewise modelling of interconnecting structure and the display of fake graphical representations that do not correspond to the model may be error prone and not intuitive to an operator or engineer, who intuitively knows where the Busbars belong, but needs to learn a specific way of configuration to get the correct results.

SUMMARY

It is an object of embodiments to provide improved devices and methods for generating or updating a hierarchical model of an asset or of a user interface used for configuring, commissioning, monitoring, and/or controlling the asset. It is in particular an object of an embodiment to provide such devices and methods that allow interconnecting structures on higher hierarchy levels of the hierarchical model to be modelled correctly on a higher hierarchy level (such as Voltage level) while allowing parts of the interconnecting structures to be displayed even when displaying a lower hierarchy level view of the asset, such as a Bay view of a substation.

According to embodiments, devices and methods are provided which use linking rules that define to which object at a higher hierarchy level an object on a lower hierarchy level of a hierarchical model of an asset is to be connected. The linking rules are used when displaying views of components on the lower hierarchy level of the hierarchical model on a graphical user interface (GUI) and/or when an operator or engineer edits the view of the lower hierarchy level.

Topologically correct modelling with reduced risk of errors is attained thereby.

A device according to an embodiment comprises a memory or storage device storing a hierarchical substation model of a power system substation. The hierarchical substation model includes substation objects associated with at least two different hierarchy levels. The at least two different hierarchy levels include a first hierarchy level and a further hierarchy level lower than the first hierarchy level. The device comprises a graphical user interface (GUI) adapted to display graphical representations of substation objects and adapted to allow a user to create and edit substation objects. The memory or storage device stores linking rules that determine to which substation object at the first hierarchy level substation objects at the further hierarchy level are to be connected. The device is adapted to automatically control the GUI based on the stored linking rules when a new substation object at the further hierarchy level is created by the user via the GUI.

The further hierarchy level may correspond to a Bay.

The further hierarchy level may correspond to a Diameter.

The further hierarchy level may be a second hierarchy level.

The hierarchical substation model may further comprise a third hierarchy level. The third hierarchy level may correspond to a Diameter Section.

The first hierarchy level may correspond to a voltage level.

The hierarchical substation model may include a tree structure.

The tree structure may be in accordance with the substation section defined in IEC 61850-6, in particular in accordance with IEC 61850-6:2009.

The tree structure may include Diameters or Sections that may be modelled as "Bays" or "Functions" in accordance with IEC 61850-6.

The device may be adapted such that, if the substation object at the first hierarchy level does not yet exist when a new substation object at the further hierarchy level is created, the device automatically creates the substation object at the first hierarchy level when the new substation object at the further hierarchy level is created, and the GUI displays a graphical representation of the new substation object at the further hierarchy level that is automatically connected to the substation object at the first hierarchy level.

The device may be adapted such that, if a substation object modelled at the first hierarchy level is created while the GUI displays a view associated with the further hierarchy level (e.g., Bay or Diameter), the device automatically creates the substation object at the first hierarchy level of the hierarchical substation model.

The device may be adapted such that, if the substation object at the first hierarchy level already exists when the new substation object at the further hierarchy level is created, the GUI displays a graphical representation of the new substation object that is automatically connected to the substation object at the first hierarchy level.

The substation object at the first hierarchy level may be a Busbar.

The device may be adapted to automatically display a graphical representation of a section of the Busbar when a bay level view of the power system substation is displayed.

The substation objects at the further hierarchy level may be switching objects.

The switching objects may be circuit breakers, switches, trucks, disconnectors and/or any other object which serves to connect/disconnect power flow and/or voltage, e.g., between two points of the same potential.

The device may comprise output control circuitry for outputting data for configuring, commissioning, monitoring, or controlling operation of the power system substation.

The data may include control data generated based on the hierarchical model.

According to another embodiment, this disclosure relates to the use of the device for configuring, commissioning, monitoring, or controlling operation of a power system substation.

A method according to an embodiment comprises displaying, based on a hierarchical substation model of a power system substation, graphical representations of substation objects via a GUI. The hierarchical substation model includes substation objects associated with at least two different hierarchy levels. The at least two different hierarchy levels include a first hierarchy level and a further hierarchy level lower than the first hierarchy level. The GUI allows a user to create and edit substation objects. The method comprises automatically controlling the GUI based on linking rules when a new substation object at the further hierarchy level is created by the user via the GUI. The linking rules determine to which substation object at the first hierarchy level the created substation object at the further hierarchy level is to be connected.

In the method, the further hierarchy level may correspond to a Bay.

In the method, the further hierarchy level may correspond to a Diameter.

In the method, the further hierarchy level may be a second hierarchy level.

In the method, the hierarchical substation model may further comprise a third hierarchy level. The third hierarchy level may correspond to a Diameter Section.

In the method, the first hierarchy level may correspond to a voltage level.

In the method, the hierarchical substation model may include a tree structure.

In the method, the tree structure may be in accordance with the substation section defined in IEC 61850-6, in particular in accordance with IEC 61850-6:2009.

The tree structure may include Diameters or Sections that may be modelled as "Bays" or "Functions" in accordance with IEC 61850-6.

The method may comprise automatically creating the substation object at the first hierarchy level when a new substation object at the further hierarchy level is created and the substation object at the first hierarchy level does not yet exist when the new substation object at the further hierarchy level is created. The method may comprise automatically displaying, by the GUI, a graphical representation of the new substation object at the further hierarchy level that is automatically connected to the substation object at the first hierarchy level.

The method may comprise automatically creating a substation object at the first hierarchy level of the hierarchical substation model if the substation object modelled at the first hierarchy level is created while the GUI displays a view associated with the further hierarchy level (e.g., Bay or Diameter).

The method may comprise automatically displaying, by the GUI, a graphical representation of the new substation object that is automatically connected to the substation object at the first hierarchy level if the substation object at the first hierarchy level already exists when the new substation object at the further hierarchy level is created.

In the method, the substation object at the first hierarchy level may be a Busbar.

The method may comprise automatically displaying a graphical representation of a section of the Busbar when a bay level view of the power system substation is displayed.

In the method, the substation objects at the further hierarchy level may be switching objects.

In the method, the switching objects may be circuit breakers, switches, trucks, disconnectors, and/or any other object which serves to connect/disconnect power flow and/or voltage, e.g., between two points of the same potential.

The method may comprise outputting data for configuring, commissioning, monitoring, or controlling operation of the power system substation via output control circuitry.

In the method, the data may include control data generated based on the hierarchical model.

The method may further comprise configuring, commissioning, monitoring, or controlling operation of a power system substation based on the hierarchical model.

The method may further comprise configuring, commissioning, monitoring, or controlling operation of a power system substation using the GUI.

The method may be performed by device according to an embodiment.

A device according to an embodiment comprises a memory or storage device storing a hierarchical model of an asset, which may be an industrial asset or a power utility asset. The hierarchical model includes objects associated with at least two different hierarchy levels. The at least two different hierarchy levels include a first hierarchy level and a further hierarchy level lower than the first hierarchy level. The device comprises a graphical user interface (GUI) adapted to display graphical representations of objects and adapted to allow a user to create and edit objects. The memory or storage device stores linking rules that determine to which object at the first hierarchy level objects at the further hierarchy level are to be connected. The device is adapted to automatically control the GUI based on the stored linking rules when a new object at the further hierarchy level is created by the user via the GUI.

A method according to an embodiment comprises displaying, based on a hierarchical model of an asset, which may be an industrial asset or a power utility asset, graphical representations of objects via a GUI. The hierarchical model includes objects associated with at least two different hierarchy levels. The at least two different hierarchy levels include a first hierarchy level and a further hierarchy level lower than the first hierarchy level. The GUI allows a user to create and edit objects. The method comprises automatically controlling the GUI based on linking rules when a new object at the further hierarchy level is created by the user via the GUI. The linking rules determine to which object at the first hierarchy level the created object at the further hierarchy level is to be connected.

In the devices and methods according to any one of the embodiments, the linking rules may be pre-defined linking rules that are based on expert knowledge.

In the devices and methods according to any one of the embodiments, the linking rules may be generated using machine learning techniques based on, e.g., previous configuring, commissioning, monitoring, and operating processes.

The device and method according to embodiments provide various advantages. Linking rules allow interconnecting structures at higher hierarchical levels to be automatically modelled with correct topology. This may be helpful when, e.g., a view of a lower hierarchy level is output via the GUI and/or when a new substation objects are added via the GUI. Busbars or other interconnecting structure can be modelled in an intuitive way while at the same time preventing or mitigating the risk of errors which would lead potentially to serious problems, such as endangering persons or incorrect configuration of topology-based protection.

Embodiments provide the effect of allowing a user to visualize and/or edit from within a branch (e.g., a Bay or Diameter) of a hierarchical model another object (e.g., a Busbar) which does not belong to this branch itself, but belongs to a higher level of the hierarchical model (e.g., the Voltage level). This is done automatically without requiring additional effort and configuration by the user.

BRIEF DESCRIPTION OF THE DRAWINGS

The subject-matter of the present disclosure will be explained in more detail with reference to preferred exemplary embodiments which are illustrated in the attached drawings, in which.

DETAILED DESCRIPTION OF EMBODIMENTS

Exemplary embodiments will be described with reference to the drawings in which identical or similar reference signs designate identical or similar elements. While some embodiments will be described in the context of a substation or a substation automation (SA) system, the methods and devices described in detail below may be used in a wide variety of system.

The features of embodiments may be combined with each other, unless specifically noted otherwise.

According to embodiments, a device uses linking rules to generate or update a hierarchical model of an asset, such as a substation.

The linking rules define to which object at a higher hierarchy level (e.g., Voltage level of the substation section defined in IEC 61850-6) elements (e.g., circuit breakers, disconnectors, switches or other switching elements) at a lower hierarchy level (e.g., Bay level of the substation section defined in IEC 61850-6 or a Diameter or Section modelled as "Bay" or "Function" in accordance with IEC 61850-6) are to be connected. The linking rules can be used to display sections of the ancestor object at the higher hierarchy level (e.g., sections of a Busbar) in a Bay view or Diameter view. The linking rules can additionally or alternatively be used to automatically modify the hierarchical model when a user edits a Bay view or Diameter view, for example. This can include the generation of an appropriate ancestor object in the hierarchical model when a new object is inserted via a graphical user interface (GUI).

This allows the user to edit or visualize an ancestor object (such as a Busbar) of a branch of the hierarchical model (such as switches in a Bay or Diameter) while a view of the Bay or Diameter is output via a graphical user interface.

The linking rules can be provided and stored in association with objects at the lower hierarchy levels, e.g., at the Bay level of the substation section defined in IEC 61850-6. The lower hierarchy levels may be Diameter or Section level. Diameters and Sections may be modelled as "Bays" or "Functions" in accordance with IEC 61850-6.

Figure 1:
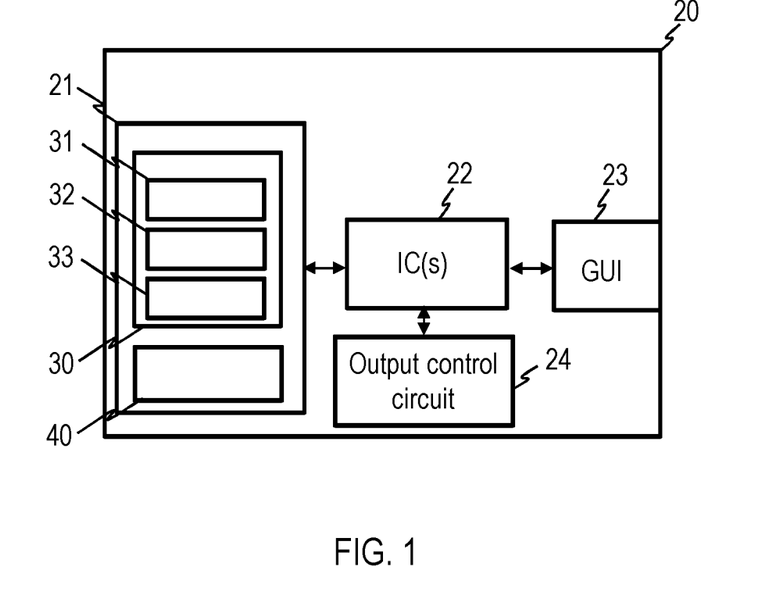
FIG. 1 is a schematic representation of a device according to an embodiment.

FIG. 1 is a schematic representation of a device 20 according to an embodiment. The device 20 comprises one or several integrated circuits (IC(s)) 22, a memory or storage device 21, and a GUI 23. The IC(s) 22 may include processors, microprocessors, controllers, microcontrollers, application specific integrated circuits (ASICs) or combinations thereof.

The memory or storage device 21 stores a hierarchical substation model 30 of a power system substation or another hierarchical model of an asset. While reference will be made to a power system substation, it will be appreciated that other assets may be modelled.

The hierarchical substation model 30 includes substation objects that are associated with at least two different hierarchy levels 31, 32, 33. The at least two different hierarchy levels include a first hierarchy level 31 and a further hierarchy level 32, 33 lower than the first hierarchy level 31.

The first hierarchy level 31 may, but does not need to be the top hierarchy level of the hierarchical model.

In an exemplary implementation, the first hierarchy level 31 may be the Voltage level. The second hierarchy level 32 may be the Bay level or Diameter level. The third hierarchy level 33 may be a Diameter section.

The memory or storage device 21 stores linking rules 40. The linking rules 40 may, but do not need to be permanently stored on the device 20. The linking rules 40 may be retrieved via a wide area network.

The linking rules 40 determine to which substation object at the first hierarchy level 31 substation objects at the further hierarchy level 32, 33 are to be connected. The linking rules 40 may define the information on the ancestor object in the hierarchical model 30 in association with the substation objects at the further hierarchy level 32, 33. For illustration, the linking rules 40 may define to which interconnecting structure (e.g., Busbar) switches, circuit breakers, disconnectors and/or any other object which serves to connect/disconnect power flow and/or voltage at the Bay or Diameter level are to be connected.

The linking rules 40 may be rules that are based on expert knowledge.

Alternatively or additionally, the linking rules 40 may be rules that are determined using machine learning techniques, e.g., based on previous configuring, commissioning, monitoring, or control use cases.

The linking rules 40 may be fixed rules that do not change during operation of the device 20 or may be subject to updates, e.g., when machine learning is implemented to update or improve the linking rules 40.

The device 20 may comprise an output control circuit 24. The output control circuit 24 may control the outputting of data for configuring, commissioning, monitoring, or controlling a substation or other asset based on the hierarchical model 30.

During operation of the device 20, the IC(s) 20 may use the linking rules 40 in various ways. For illustration, when the IC(s) 22 control the GUI 23 to display a Bay view or Diameter view of the substation, the IC(s) 22 may control the GUI 23 such that it automatically shows a section of a Busbar or other interconnecting structure on the Bay view or Diameter view, even when the Busbar or other interconnecting structure is an ancestor object that is modelled on a higher hierarchy level than the switching objects modelled at the Bay, Diameter or Section level. This may be done based on the linking rules 40.

Alternatively or additionally, when a user input is received via the GUI 23 that edits or adds an object at the Bay view or Diameter view, the IC(s) 20 may use the linking rules 40 to automatically create an ancestor object at the higher hierarchy level 31 if it does not yet exist. This ensures that the ancestor object (e.g., the Busbar or other interconnecting structure) is modelled correctly in an intuitive way at the higher hierarchy level at which it belongs.

Figure 2:
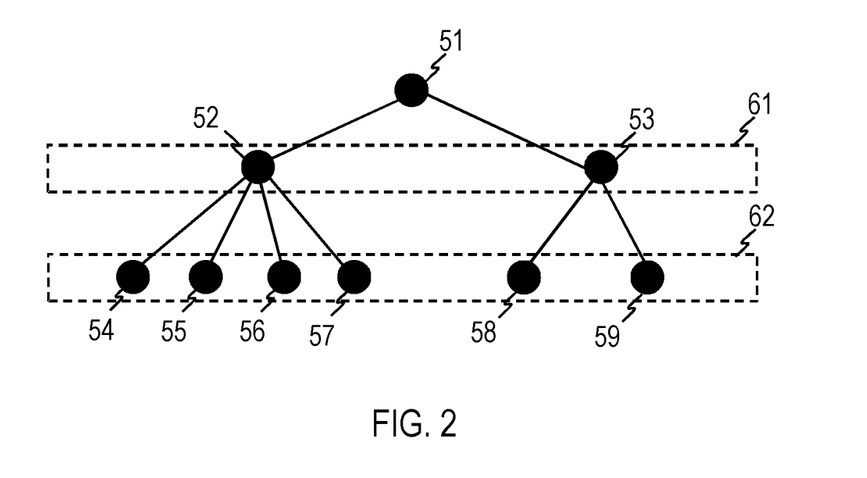
FIG. 2 is a schematic representation of a hierarchical substation model.

FIG. 2 shows an exemplary tree structure of a hierarchical substation model. A top node 51 may define the substation. Nodes 52, 53 may represent Busbars that connect several Bays. Nodes 52, 53 may be at the Voltage level 61 and are ancestor nodes for objects at the Bay or Diameter level 62. Nodes 54-59 may represent switching objects, such as circuit breakers, disconnectors, or switches, at the Bay or Diameter level 62.

The device 20 may allow a user to open various views of the substation and may control the GUI 23 in dependence on the view that is to be output. On a Voltage level view, objects such as Busbars modelled at the Voltage level are displayed.

Importantly, when a Bay or Diameter level view is displayed via the GUI 23, the IC(s) 20 ensure that sections of the Busbars are also included in the output graphical representation, even when the Busbars are modelled at the higher Voltage level and not at the Bay or Diameter level. Thus, interconnecting objects modelled at the first hierarchy level 31, 61 of the hierarchical model can be visible on the GUI 23 even when a view of the lower hierarchy level objects, such as Bay level view, is being output.

The device 20 automatically displays sections of the Busbars in Bay or Diameter level view. This can be done automatically and without requiring any additional configuration effort from the user.

When a Busbar is added to the Bay in Bay view, the IC(s) 20 will automatically model the Busbar in the higher hierarchy level (Voltage level) to which it belongs, without duplicating the Busbar in the Bay level.

Intuitive, but topologically correct modelling is afforded by the device 20.

Figure 3:
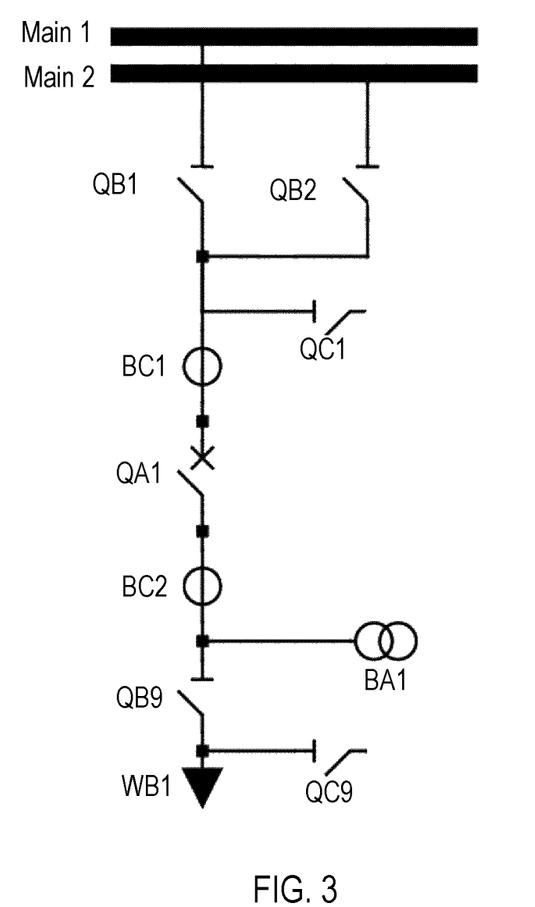
FIG. 3 is a schematic representation of a Bay view of a substation.

FIG. 3 is an exemplary Bay view of a substation output via GUI 23 under the control of the IC(s) 22. The Bay view shows representations of various switching objects QB1, QB2, QA1, QB9, QC) and transformers BC1, BC2. Sections of Busbars Main 1 and Main 2 are included in the Bay view in an intuitive manner, facilitating the engineer or other user to work with the device.

The use of the linking rules 40 by the IC(s) 22 is not limited to generating the views output via the GUI 23. The linking rules 40 may also be used during editing, in which case an ancestor object in the hierarchical model 30 may be created or modified even when the GUI 23 outputs a lower hierarchy level view (e.g., Bay or Diameter level).

Figure 4:
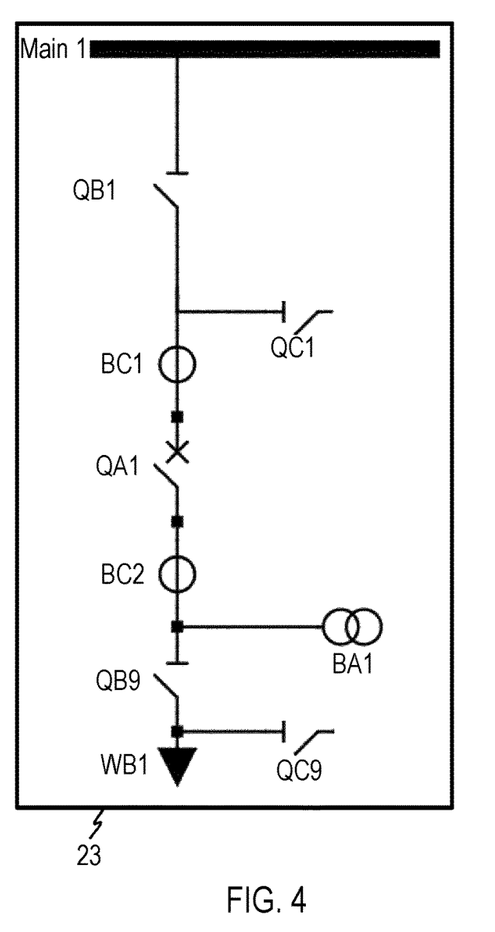
FIGS. 4 and 5 are exemplary Bay views of a substation output in a method according to an embodiment.
Figure 5:
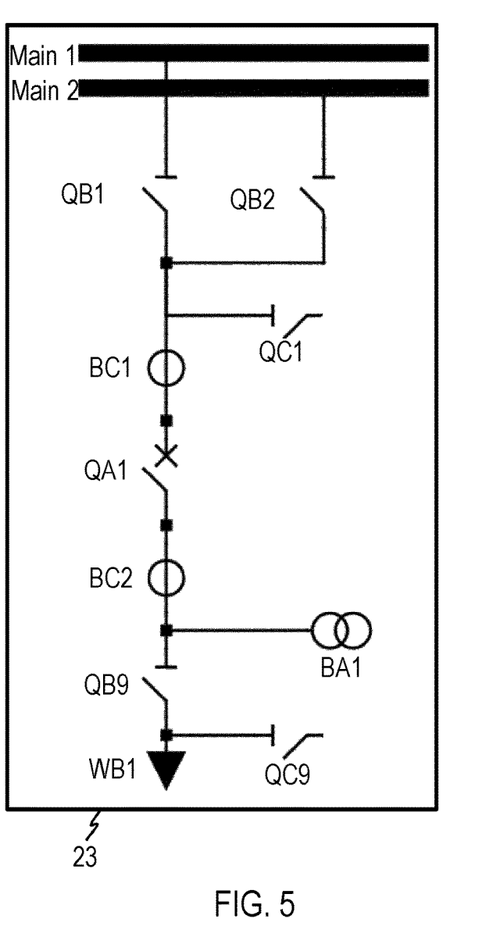
Figure 6:
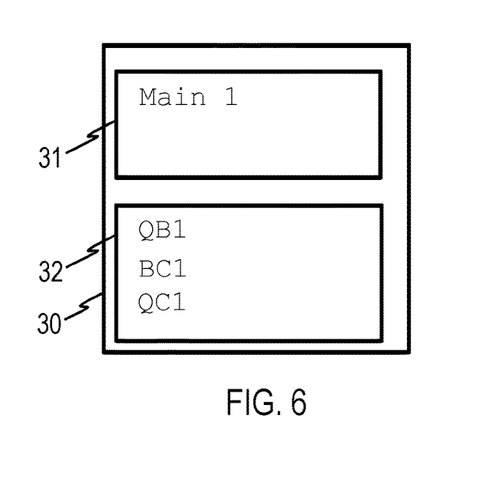
FIGS. 6 and 7 represent portions of a hierarchical substation model in a method according to an embodiment.
Figure 7:
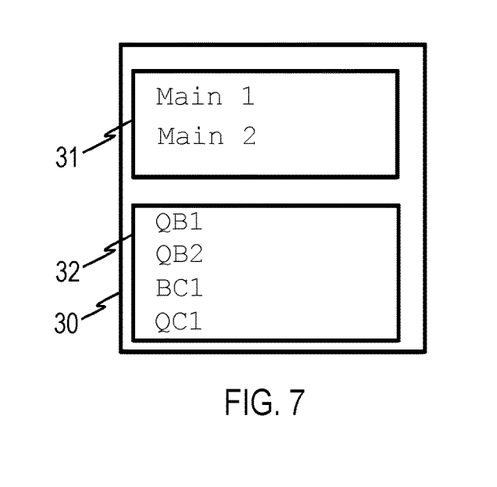

FIGS. 4 and 5 are exemplary views of the GUI 23 in various stages during operation of the device 20 according to an embodiment. FIGS. 6 and 7 are schematic views of the hierarchical substation model 30 in these operational stages.

FIG. 4 shows a Bay level view output via GUI 23. While Busbar Main 1 and switching object QB1 already exist and are included in the Bay level view, a switching object QB2 and the Busbar Main 2, which is its ancestor object at the Voltage level, is not yet included in the view on GUI 23 shown in FIG. 4.

When the view shown in FIG. 4 is edited to include the Busbar Main 2, the IC(s) 22 will automatically generate the respective data for the object Busbar Main 2 in the first hierarchy level 31 of the hierarchical substation model 30 in response to the user input via the GUI 23. Alternatively or additionally, the IC(s) 22 will automatically generate the respective data for the object Busbar Main 2 in the first hierarchy level 31 of the hierarchical substation model 30 when the user adds the switching object QB2 in the Bay view.

The generation of the object Busbar Main 2 is schematically indicated in the representations of the hierarchical substation model 30 in FIGS. 6 and 7.

The generation of the object Busbar Main 2 is done automatically at the correct hierarchy level of the hierarchical substation model 30. The risk of incorrect modelling or incorrect configuring, commissioning, monitoring, or control of a substation is mitigated.

Figure 8:
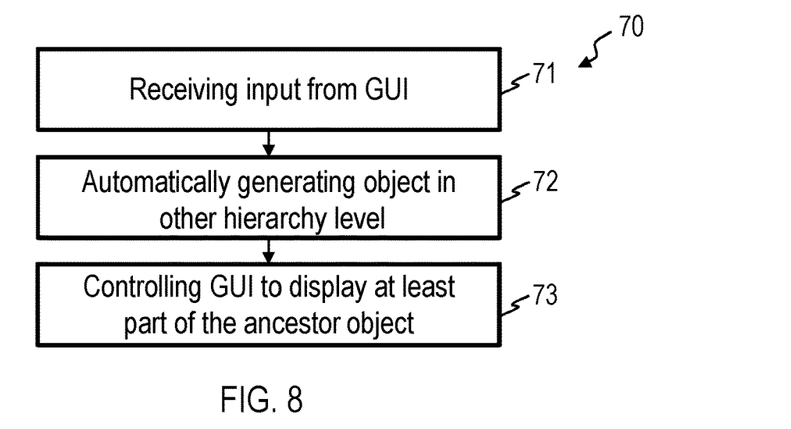
FIG. 8 is flow chart of a method according to an embodiment.

FIG. 8 is a flow chart of a method 70 according to an embodiment. The method 70 may be performed by the device 20.

At step 71, input from a GUI 23 is received by the IC(s) 22. The input may edit a Bay view or Diameter view of a substation.

At step 72, an object at a higher hierarchy level 31 (e.g., the Voltage level) of the hierarchical substation model 30 may be generated, even when the editing occurs while the Bay view or Diameter view is output via the GUI 23. It will be appreciated that objects that belong to the Bay level will continue to be modelled at the Bay level. The IC(s) 22 may use the linking rules 40 to determine at which hierarchy level a new object must be included in the hierarchical substation model 30.

At step 73, the IC(s) may control the GUI 23 to display at least part of the ancestor object that is modelled at a hierarchy level that is higher than Bay or Diameter level. The ancestor object may be a Busbar or another interconnecting structure that interconnects a plurality of Bays of the substation.

Figure 9:
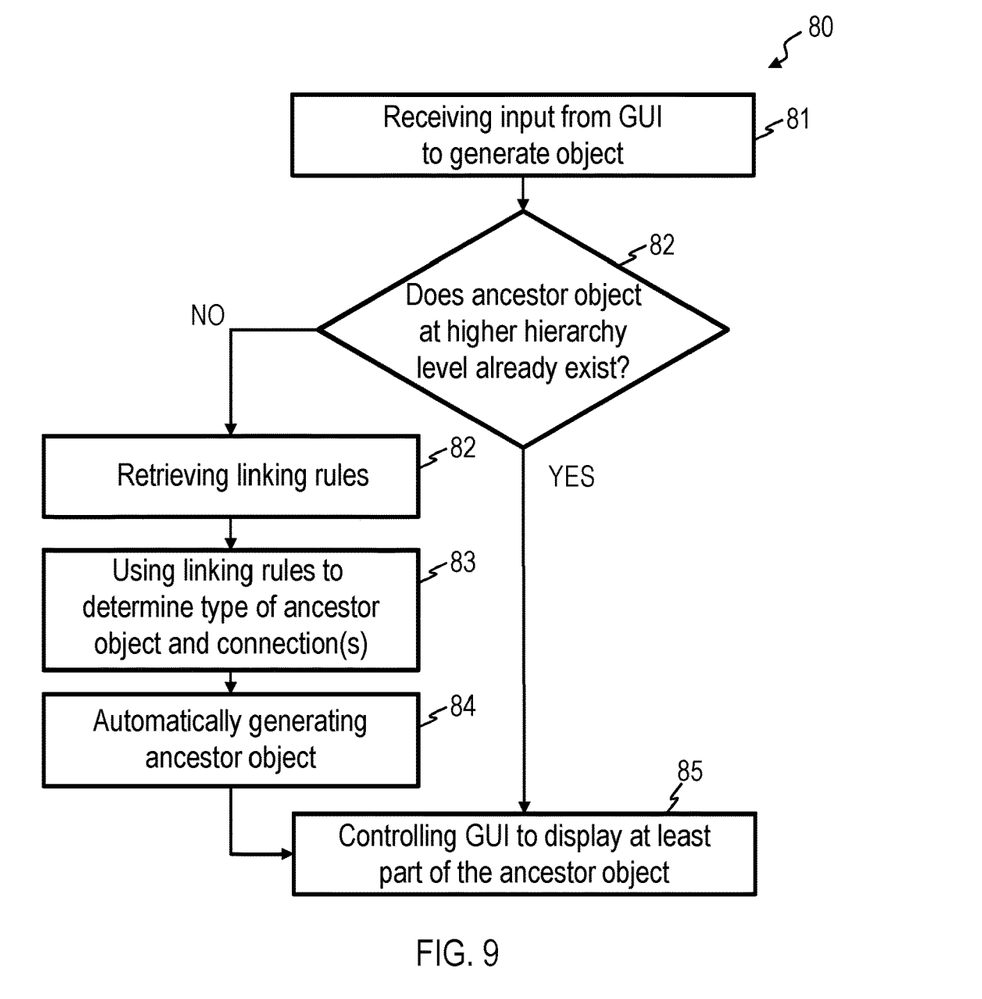
FIG. 9 is flow chart of a method according to an embodiment.

FIG. 8 is a flow chart of a method 80 according to an embodiment. The method 80 may be performed by the device 20.

At step 81, input from a GUI 23 is received by the IC(s) 22. The input may edit a Bay view or Diameter view of a substation, e.g., by adding a new object.

At step 82, it is determined whether an ancestor object at the higher hierarchy level already exists in the hierarchical substation model 30. A Busbar connecting to switching objects in the Bay view is an example for such an ancestor object. The Busbar is defined at the Voltage level, while the switching objects may be defined at the Bay or Diameter level.

At step 85, if the ancestor object already exists in the appropriate hierarchy level 31 of the hierarchical substation model 30, the GUI 23 is controlled to display at least part of the ancestor object that is modelled at a hierarchy level that is higher than Bay or Diameter level.

At step 82, if the ancestor object does not already exist in the appropriate hierarchy level 31 of the hierarchical substation model 30, the linking rules 82 are retrieved by the IC(s) 22.

At step 83, the linking rules are used by the IC(s) 22 to determine the type of ancestor object and optionally its connections to the switching object generated by the user input action at step 81.

At step 84, the ancestor object is automatically generated in the appropriate hierarchy level 31 of the hierarchical substation model 30.

At step 85, the GUI 23 may be controlled to display at least part of the ancestor object that is modelled at a hierarchy level that is higher than Bay or Diameter level.

The hierarchical substation model 30 may then be used to generate data for configuring, commissioning, monitoring, or controlling a power utility, e.g., a substation.

For illustration, the hierarchical substation model 30 generated by the device 20 may be used for displaying operational states or other configuration information relating to a power utility such as a substation in a control center for controlling or monitoring the power utility during ongoing operation.

While embodiments have been described in detail in the drawings and foregoing description, such description is to be considered illustrative or exemplary and not restrictive. Variations to the disclosed embodiments can be understood and effected by those skilled in the art and practicing the claimed embodiments, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A device, comprising:
one or more processors;
a memory or storage device storing a hierarchical substation model of a power system substation, the hierarchical substation model including substation objects associated with at least two different hierarchical levels, the at least two different hierarchy levels including a first hierarchy level and a further hierarchy level lower than the first hierarchy level; and
a graphical user interface (GUI) displaying graphical representations of substation objects and allows a user to create and edit substation objects;
wherein the memory or storage device stores linking rules that determine to which substation object at the first hierarchy level substation objects at the further hierarchy level are to be connected, and
wherein the device is adapted to automatically control the GUI based on the stored linking rules when a new substation object at the further hierarchy level is created by the user via the GUI, wherein the device is adapted such that, when a substation object at the first hierarchy level does not yet exist when the new substation object at the further hierarchy level is created, the device automatically creates the substation object at the first hierarchy level when the new substation object at the further hierarchy level is created.

2. The device of claim 1, wherein the further hierarchy level corresponds to a bay.

3. The device of claim 1, wherein the further hierarchy level corresponds to a diameter.

4. The device of claim 3, wherein the further hierarchy level is a second hierarchy level and the hierarchical substation model further comprises a third hierarchy level, wherein the third hierarchy level corresponds to a diameter section.

5. The device of claim 1, wherein the first hierarchy level corresponds to a voltage level.

6. The device of claim 1, wherein the hierarchical substation model includes a tree structure, optionally wherein the tree structure is in accordance with a substation section defined in International Electrotechnical Commission (IEC) 61850-6.

7. The device of claim 1, wherein the device is adapted such that, when the substation object at the first hierarchy level does not yet exist when a new substation object at the further hierarchy level is created, the GUI displays a graphical representation of the new substation object at the further hierarchy level that is automatically connected to a graphical representation of the created substation object at the first hierarchy level.

8. The device of claim 1, wherein the device is adapted such that, when the substation object at the first hierarchy level already exists when the new substation object at the further hierarchy level is created, the GUI displays a graphical representation of the new substation object at the further hierarchy level that is automatically connected to a graphical representation of the substation object at the first hierarchy level.

9. The device of claim 1, wherein the substation object at the first hierarchy level is a busbar.

10. The device of claim 9, wherein the device is adapted to automatically display a graphical representation of a section of the busbar when a bay view of the power system substation is displayed.

11. The device of claim 1, wherein the substation objects at the further hierarchy level are switching objects.

12. A method, comprising:
displaying, based on a hierarchical substation model of a power system substation, graphical representations of substation objects via a graphical user interface (GUI) wherein:
the hierarchical substation model includes substation objects associated with at least two different hierarchy levels, the at least two different hierarchy levels including a first hierarchy level and a further hierarchy level lower than the first hierarchy level, and
the GUI allows a user to create and edit substation objects;
automatically creating a substation object at the first hierarchy level when a new substation object at the further hierarchy level is created and the substation object at the first hierarchy level does not yet exist when the new substation object at the further hierarchy level is created; and
automatically controlling the GUI based on linking rules when the new substation object at the further hierarchy level is created by the user via the GUI, wherein the linking rules determine to which substation object at the first hierarchy level the created substation object at the further hierarchy level is to be connected.

13. The method of claim 12, wherein the hierarchical substation model includes a tree structure in accordance with the substation section defined in International Electrotechnical Commission (IEC) 61850-6.

14. The method of claim 12, wherein the further hierarchy level corresponds to a bay.

15. The method of claim 12, wherein the further hierarchy level is a second hierarchy level that corresponds to a diameter, and the hierarchical substation model further comprises a third hierarchy level that corresponds to a diameter section.

16. The method of claim 12, wherein the first hierarchy level corresponds to a voltage level.

17. The method of claim 12, wherein the hierarchical substation model includes a tree structure in accordance with a substation section defined in International Electrotechnical Commission (IEC) 61850-6.

18. The method of claim 12, further comprising displaying a graphical representation of the new substation object at the further hierarchy level that is automatically connected to the substation object at the first hierarchy level.

19. The method of claim 12, wherein the substation object at the first hierarchy level is a busbar, and the method further comprises automatically displaying a graphical representation of a section of the busbar when a bay view of the power system substation is displayed.

20. A non-transitory computer-readable medium having instructions stored thereon, wherein the instructions, when executed by a processor, cause the processor to:
display, based on a hierarchical substation model of a power system substation, graphical representations of substation objects via a graphical user interface (GUI) wherein:
the hierarchical substation model includes substation objects associated with at least two different hierarchy levels, the at least two different hierarchy levels including a first hierarchy level and a further hierarchy level lower than the first hierarchy level, and
the GUI allows a user to create and edit substation objects;
automatically create a substation object at the first hierarchy level when a new substation object at the further hierarchy level is created and the substation object at the first hierarchy level does not yet exist when the new substation object at the further hierarchy level is created; and
automatically control the GUI based on linking rules when the new substation object at the further hierarchy level is created by the user via the GUI, wherein the linking rules determine to which substation object at the first hierarchy level the created substation object at the further hierarchy level is to be connected.

* * * * *